(12) United States Patent
Chang et al.

(10) Patent No.: US 7,729,454 B2
(45) Date of Patent: Jun. 1, 2010

(54) METHOD AND SYSTEM FOR SIGNAL PHASE VARIATION DETECTION IN COMMUNICATION SYSTEMS

(75) Inventors: Li Fung Chang, Holmdel, NJ (US);
Hongwei Kong, Denville, NJ (US);
Nelson Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 792 days.

(21) Appl. No.: 11/565,082

(22) Filed: Nov. 30, 2006

(65) Prior Publication Data

US 2008/0130795 A1    Jun. 5, 2008

(51) Int. Cl.
*H04L 27/00* (2006.01)

(52) U.S. Cl. .................. 375/324; 375/260; 375/316; 375/340; 375/358

(58) Field of Classification Search .............. 375/324, 375/340, 358, 260, 316
See application file for complete search history.

(56) References Cited

U.S. PATENT DOCUMENTS

| | | | | |
|---|---|---|---|---|
| 4,941,155 A | * | 7/1990 | Chuang et al. | 375/330 |
| 5,526,383 A | * | 6/1996 | Takenaka et al. | 375/356 |
| 5,740,205 A | * | 4/1998 | Baum et al. | 375/344 |
| 7,515,582 B2 | * | 4/2009 | Wang | 370/350 |

* cited by examiner

*Primary Examiner*—Ted M Wang
(74) *Attorney, Agent, or Firm*—McAndrews, Held & Malloy

(57) ABSTRACT

Aspects of a method and system for signal phase variation detection in communication systems are presented. Aspects of the system may enable detection of phase change between a current received symbol, and one or more previous received symbols. Based on the phase change a channel estimation filter bandwidth may be selected for despreading and/or descrambling one or more subsequent received symbols. In addition, a decision may be made as to whether the subsequent received symbols are to be received based on a closed loop system, or based on an open loop system.

22 Claims, 9 Drawing Sheets

METHOD AND SYSTEM FOR SIGNAL PHASE VARIATION DETECTION IN COMMUNICATION SYSTEMS

CROSS-REFERENCE TO RELATED APPLICATIONS/INCORPORATION BY REFERENCE

NOT APPLICABLE.

FIELD OF THE INVENTION

Certain embodiments of the invention relate to wireless communication. More specifically, certain embodiments of the invention relate to a method and system for signal phase variation detection in communication systems.

BACKGROUND OF THE INVENTION

Cellular communication systems provide wireless communication services in many populated areas of the world. While cellular communication systems were initially constructed to service voice communications, they are now called upon to support data communications as well. The demand for data communication services has exploded with the acceptance and widespread use of the Internet. While data communications have historically been serviced via wired connections, cellular users now demand that their wireless units also support data communications. Many wireless subscribers now expect to "surf" the Internet, access email, and perform other data communication activities using their cellular phones, wireless personal data assistants, wirelessly linked notebook computers, and/or other wireless devices. The demand for wireless communication system data communications continues to increase with time. Thus, existing wireless communication systems are currently being created or modified to service these burgeoning data communication demands.

Cellular networks include a network infrastructure that wirelessly communicates with wireless terminals within a respective service area. The network infrastructure typically includes a plurality of base stations dispersed throughout the service area, each of which supports wireless communications within a respective cell or set of sectors. The base stations may be coupled to base station controllers (BSCs), with each BSC serving a plurality of base stations. Each BSC is coupled to a mobile switching center (MSC). Each BSC also typically directly or indirectly coupled to the Internet.

In operation, each base station (BS) communicates with a plurality of wireless terminals operating in its cell/sectors. A BSC coupled to the base station routes voice communications between the MSC and the serving base station. The MSC routes the voice communication to another MSC or to the PSTN, for example. The BSCs route data communications between a servicing base station and a packet data network that may include or couple to the Internet. Transmissions from base stations to wireless terminals are referred to as "forward link or downlink" transmissions while transmissions from wireless terminals to base stations are referred to as "reverse link or uplink" transmissions.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

A mobile handset may receive and/or decode signals received in a downlink channel from a base station based on coherent detection or noncoherent detection. For coherent detection, the base station may transmit a pilot channel that contains a bit pattern upon which the mobile handset may compute a channel estimate, which characterizes the wireless medium, or channel, through which signals travel between the base station and the mobile handset. The channel estimate, or channel state information (CSIT) may enable detection of information, or symbols, contained in received and/or decoded signals. In a closed loop transmit diversity system, the CSIT may be communicated to the base station in an uplink channel. For noncoherent detection, the mobile handset may attempt to decode received signals without utilizing CSIT.

The characteristics signals transmitted by the base station, for example amplitude and or phase, may be altered as the signals travel in the wireless medium and are received at the mobile terminal. The alteration of the signals may be referred to as fading. In addition to fading, the received signals may comprise noise that was introduced during the travel of the signals through the wireless medium.

The received signal may be spread and scrambled wherein the scrambled signal comprises a plurality of chips. The mobile terminal may descramble the scrambled signal and despread (integrate, or sum) the descrambled signal to detect a symbol. The number of chips contained in a detected symbol may comprise an integration length.

When the integration does not comprise a sufficiently long time interval, the noise component may not be attenuated sufficiently to achieve a desired signal to noise ratio (SNR), wherein the signal refers to the altered signal component in the received signal, and the noise refers to the noise component in the received signal. However, when the mobile terminal is in motion relative to the base station, the CSIT information may be dynamic. Thus, when the integration comprises too long of a time interval with coherent detection, the CSIT may change during the integration time interval, which may result in erroneous detection of symbols. This may also result in a failure to achieve a desired SNR for the received signals.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for signal phase variation detection in communication systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for signal phase variation detection in communication systems. Various embodiments of the invention may comprise a method and a system that detects a phase change between a current received symbol, and one or more previous received symbols. Based on the phase change, a channel estimation filter bandwidth (e.g., an integration length) may be selected for one or more subsequent received symbols. In addition, a decision may be made by the node B element or radio network controller as to whether a closed-loop transmit diversity or an open-loop transmit diversity should be used.

Figure 1:
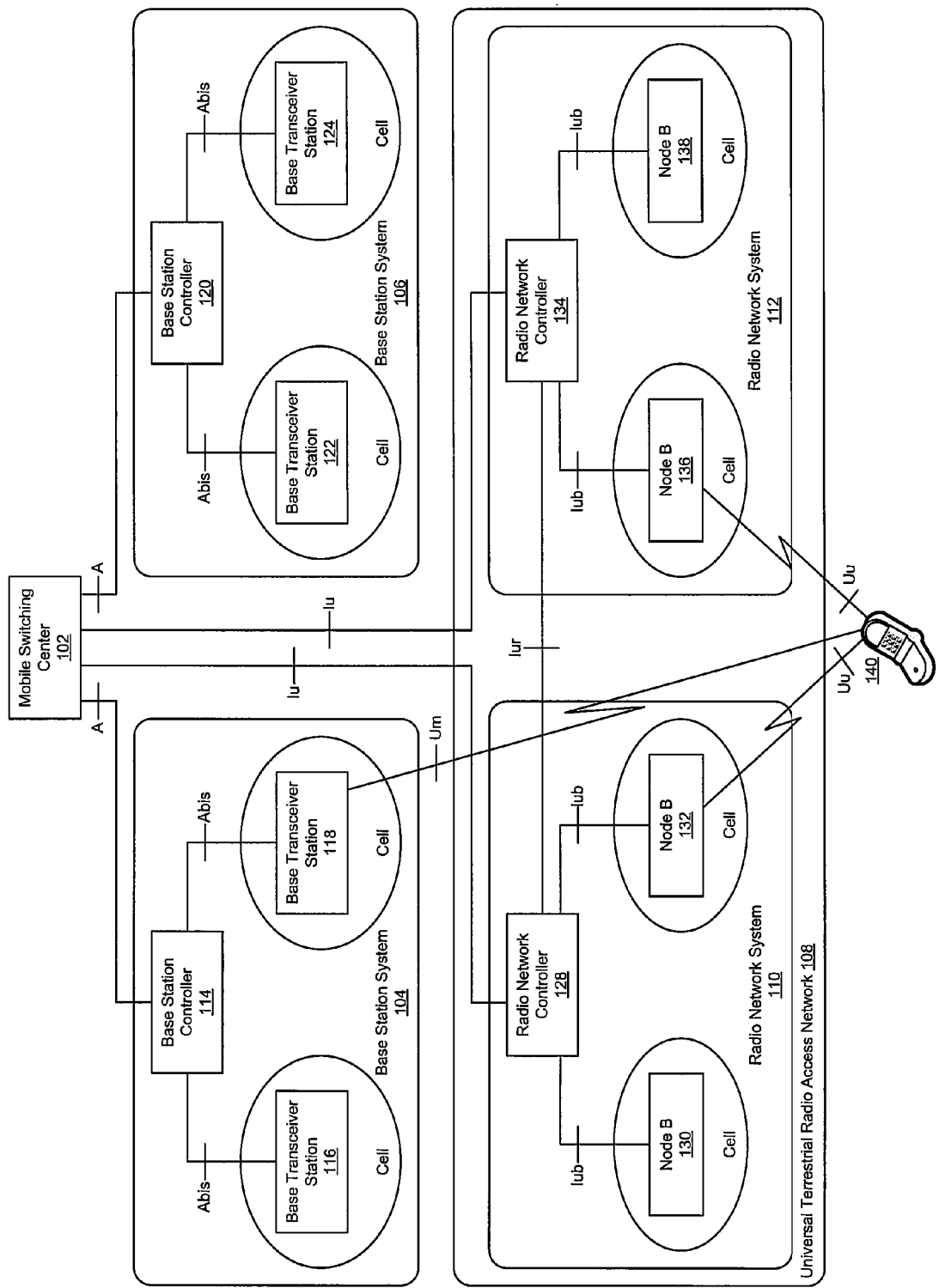
FIG. 1 illustrates an exemplary 3$^{rd}$ generation (3G) GSM network, which may be utilized in connection with an embodiment of the invention.

FIG. 1 illustrates an exemplary 3$^{rd}$ generation (3G) GSM/UMTS network, which may be utilized in connection with an embodiment of the invention. Referring to FIG. 1 there is shown a mobile switching center (MSC) 102, a base station system (BSS) 104, a BSS 106, a universal terrestrial radio access network (UTRAN) 108, and a mobile station (MS) 140. The BSS 104 may comprise a base station controller (BSC) 114, a base transceiver station (BTS) 116, and a BTS 118. The BSS 106 may comprise a BSC 120, a BTS 122, and a BTS 124. The UTRAN 108 may comprise a radio network system (RNS) 110, and an RNS 112. The RNS 110 may comprise a radio network controller (RNC) 128, a node B 130, and a node B 132. The RNS 112 may comprise a RNC 134, a node B 136, and a node B 138.

The MSC 102 may be coupled to the BSC 114 via an A interface, and to the BSC 120 via an A interface. The MSC 102 may be coupled to the RNC 128 via an Iu interface. The MSC 102 may be coupled to the RNC 134 via an Iu interface. The BSC 114 may be coupled to the BTS 116 via an Abis interface. The BSC 114 may be coupled to the BTS 118 via an Abis interface. The BSC 120 may be coupled to the BTS 122 via an Abis interface and to the BTS 124 via an Abis interface. The RNC 128 may be coupled to the node B 130 via an Iub interface and to the node B 132 via an Iub interface. The RNC 134 may be coupled to the node B 136 via an Iub interface, and to the node B 138 via an Iub interface. The RNC 128 may be coupled to the RNC 134 via an Iur interface. The MS 140 may be coupled to a BTS via a Um interface. The MS 140 may be coupled to a node B via a Uu interface.

The elements of a 2$^{nd}$ generation GSM network may comprise one or more MSC 102 elements, and one or more BSS 104 elements. The elements of a 3G GSM network may comprise one or more MSC 102 elements, one or more BSS 104 elements, and one or more UTRAN 108 elements. The MSC 102 may comprise suitable circuitry, logic, and/or code that may enable switching functions within at least a portion of a wireless communications network. The MSC 102 may control the operation of BSC, BTS, RNC, and/or node B elements within a GSM network that enable a subscriber utilizing an MS 140 to communicate with other subscribers on the GSM network, or with subscribers on other wireless or wired networks. The MSC 102 may control the operation of the BSC 114, and BTSs 116 and 118 via an A interface. The MSC 102 may control the operation of the RNC 128, and node B elements 130 and 132 via an Iu interface. The MS 140 may communicate with a BTS 118 element via a Um interface. The MS 140 may communicate with a node B 132 element via a Uu interface.

The BSC 114 may comprise suitable circuitry, logic, and/or code that may control the operation of one or more BTS 116 elements within a BSS 104 and enable a subscriber to utilize wireless communications services within at least a portion of a service area. The area in which the subscriber may utilize the BSC 114 to receive wireless communications services may comprise a BSC area. The BSC 114 may control the operation of a BTS 116 element via an Abis interface. The BTS 116 may comprise suitable circuitry, logic, and/or code that may enable a subscriber to utilize wireless communications services within at least a portion of a BSC area. The area in which the subscriber may utilize the BTS 116 to receive wireless communications service may comprise a cell. The BTS 116 may comprise radio transceivers that may be utilized to wirelessly communicate with one or more MS 140 elements. The BTS 116 may select one or more frequencies that may be utilized to establish one or more RF channels. The RF channel(s) may be utilized to communicate with an MS 140 element. The BTS 116 may transmit information to an MS 140 element via a downlink channel. The BTS 116 may receive information from an MS 140 element via an uplink channel.

The RNC 128 may comprise suitable circuitry, logic, and/or code that may control the operation of one or more node B 130 elements within an RNS 110 and enable a subscriber to utilize wireless communications services within at least a portion of a service area. The area in which the subscriber may utilize the RNC 128 to receive wireless communications services may comprise an RNC area. The RNC 128 may control the operation of a node B 130 element via an Iub interface. The node B 130 may comprise suitable circuitry, logic, and/or code that may enable a subscriber to utilize wireless communications services within at least a portion of an RNC area. The area in which the subscriber may utilize the node B 130 to receive wireless communications service may comprise a cell. The node B 130 may comprise radio transceivers that may be utilized to wirelessly communicate with one or more MS 140 elements. The node B 130 may select one or more frequencies that may be utilized to establish one or more RF channels. The RF channel(s) may be utilized to communicate with an MS 140 element. The node B 130 may transmit information to an MS 140 element via a downlink channel. The node B 130 may receive information from an MS 140 element via an uplink channel.

The MS 140 may comprise suitable circuitry, logic, and/or code that may enable a subscriber to originate and/or receive calls and/or other services via a wireless network. The MS 140 may provide radio control management by receiving information via one or more downlink channels and/or by transmitting information via one or more uplink channels. The MS 140 may decode information received wirelessly and/or encode information to be transmitted wirelessly. The MS 140 may provide a user interface, comprising a keypad, and visual and/or audio input and output that may enable a user to originate and/or receive voice, data, and/or video communications via the wireless network. The MS 140 may provide mobility management by enabling a subscriber engaged in an established call to move from an area served by a current cell to an area served by a subsequent cell without losing the ability to subsequently continue to communicate via the established call.

The BTS 118, 122, and 124 may be substantially as described for the BTS 116. The BSC 120 may be substantially as described for the BSC 114. The BSS 106 may be substantially as described for the BSS 104. The node B 132, 136, and 138 may be substantially as described for the node B 130. The RNC 134 may be substantially as described for the RNC 128. The RNS 112 may be substantially as described for the RNS 110.

In operation, a subscriber may utilize the MS 140 to attempt to initiate a new call within the MSC area served by the MSC 102 via a node B 132 element. The MSC 102 may utilize the Iu interface to receive information in connection with the attempted call initiation from an RNC 128 element. The information may identify the location of the subscriber by indicating a specific cell associated with a node B 132 element that received the request from the MS 140 associated with the new call attempt. If the attempted call is accepted, the MSC 102 may indicate to the RNC 128 element that the new call attempt is to be accepted via the Iu interface.

In response, the RNC 128 element may allocate resources at the corresponding node B 132 element, such as a transceiver assignment and one or more downlink and/or uplink frequency assignments, which may be utilized for communicating with the MS 140. The RNC 128 element may also assign transmitting power levels and/or one or more orthogonal variable spreading factor (OVSF) codes that may be utilized during communications between the node B 132 element and the MS 140 via an assigned RF channel. The RNC 128 element may communicate these assignments to the corresponding node B 132 element via the Iub interface. The node B 132 element may subsequently utilize the assigned resources when communicating with the MS 140 via the Uu interface. The MS 140 may utilize wideband code division multiple access (W-CDMA) when utilizing an RF channel to communicate with the node B 132 element via the Uu interface.

During an active call, the MS 140 may receive pilot symbols transmitted by the node B 132 element via the common pilot channel (CPICH), for example. The symbols may be received at a given sample rate, $r_{Smp}$, for which the time duration between samples may be expressed by the variable $\delta_{Smp}$ such that $r_{Smp}=1/\delta_{Smp}$. The signal received via the CPICH at the MS 140 may be a spread spectrum signal. The MS 140 may utilize a despreading code to despread the received signal. The received signal power for the despread signal may be measured and compared to a reference signal level, for example 1 mW. This measurement may be referred to as the received signal code power (RSCP) for the received signal. The RSCP may be measured in units of decibels relative to 1 mW power (dBm). RSCP may also be measured for signals received via other channels, for example, the common control physical channel (CCPCH). The MS 140 may measure the RSCP for a received signal and encode the measured value into one of a plurality of RSCP signal levels. The MS 140 may also measure RSCP signal levels for CPICH signals received from node B elements and/or BTS elements located in neighboring cells. The MS 140 may compile the RSCP signal levels into an RSCP report. The MS 140 may communicate the RSCP report to the node B element 132. The node B element 132 may transfer the received RSCP signal report information to the RNC 128. The RNC 128 may utilize the RSCP report information to determine whether to initiate a handover of an existing call from the MS 140 from a cell served by the node B element 132, to a cell served by the node B element 136, for example. If the handoff is to be initiated, the RNC 128 may initiate communication with the RNC 134 via the Iur interface to effect the handover.

During an existing call the MS 140 may be in motion relative to the node B 132 element. This may induce Doppler frequency shifts such that the carrier frequency received at the MS 140 may differ from the carrier frequency transmitted at node B elements 132 and 136. This difference in carrier frequencies between the MS 140 and the node B elements 132 and 136 may in turn result in a frequency offset between received symbols. The frequency offset may produce a corresponding relative timing phase variation between received symbols.

In various embodiments of the invention, the phase variation between a current symbol and one or more previously received symbols may be measured. In an exemplary embodiment of the invention, a phase variation may be measured between the current symbol Sym(t), and a previously received symbol Sym(t−2·$\delta_{Smp}$), Sym(t−2·$\delta_{Smp}$) may refer to a symbol received 2 sample periods previous to the current symbol Sym(t). Based on the measured phase of the symbols Sym(t) and Sym(t−2·$\delta_{Smp}$), and the current RSCP measurements for signal and noise, a differential phase value may be computed. Based on the differential phase value, the channel estimation filter bandwidth may be increased, decreased, or kept at the current length, for receiving subsequent symbols. In addition, a decision may be made as to whether to utilize an open loop transmit diversity system or a closed loop transmit diversity system for reception of the subsequent symbols. In various embodiments of the invention, the MS 140 may report the computed differential phase value to the node B element 132, wherein the RNC 128 may make determinations about whether an open loop or closed loop mode will be subsequently utilized in communications between the node B element 132, and the MS 140. For example, large values for computed differential phase may indicate a channel for which the fading parameters are changing rapidly, which may be referred to as a fast fading channel. In this case, the appropriate channel estimation filter bandwidth may be so large as to limit the ability to attenuate noise components in received signals. In this case, the RNC 128 may also determine that an open loop transmit diversity mode may be appropriate. Small values for computed differential phase may indicate a channel for which the fading parameters are changing slowly, which may be referred to as a slow fading channel. In this case, the RNC 128 may determine that a closed loop mode may be appropriate, and the MS 140 may determine a small channel estimation filter bandwidth shall be selected.

Various embodiments of the invention may be practiced in systems in which the node B element 132 and/or the MS 140 utilized space time transmit diversity (STTD). In addition, a compressed mode may be supported in which the invention may be practiced during time periods for which new CSIT is not computed.

Figure 2:
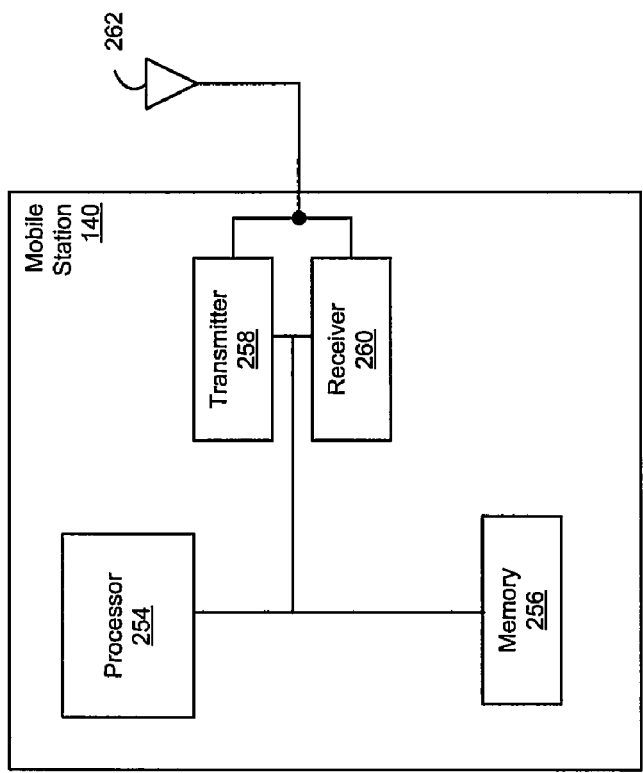
FIG. 2 is a block diagram of an exemplary mobile station, which may be utilized in connection with an embodiment of the invention.

FIG. 2 is a block diagram of an exemplary mobile station, which may be utilized in connection with an embodiment of the invention. Referring to FIG. 2, there is shown a mobile station (MS) 140, and an antenna 262. The MS 140 may comprise a processor 254, memory 256, a transmitter 258, and a receiver 260. The processor 254 may comprise suitable logic, circuitry, and/or code that may enable processing of information and/or data associated with the transmission and reception of signals at the MS 140. The processor 254 may, for example, configure a channel estimation filter bandwidth for receiving signals at the receiver 260 in response to one or more computed differential phase values. The memory 256 may comprise suitable logic, circuitry, and/or code that may store data and/or control information that may be utilized in the operation of at least a portion of the MS 140. For example, the memory 256 may be utilized to store intermediate results of calculations related to AFC.

The transmitter 258 may comprise suitable circuitry, logic, and/or code that may be utilized to transmit signals wirelessly. The transmitter 258 may perform coding functions, signal modulation, and/or signal amplification. The receiver 260 may comprise suitable circuitry, logic, and/or code that may be utilized to receive wireless signals. The receiver 260 may perform decoding functions, signal demodulation, and/or signal amplification. The receiver 260 may also detect frequency offsets based on received signals. The antenna 262 may comprise suitable circuitry, logic, and/or code that may enable the reception and/or transmission of wireless signals.

Figure 3:
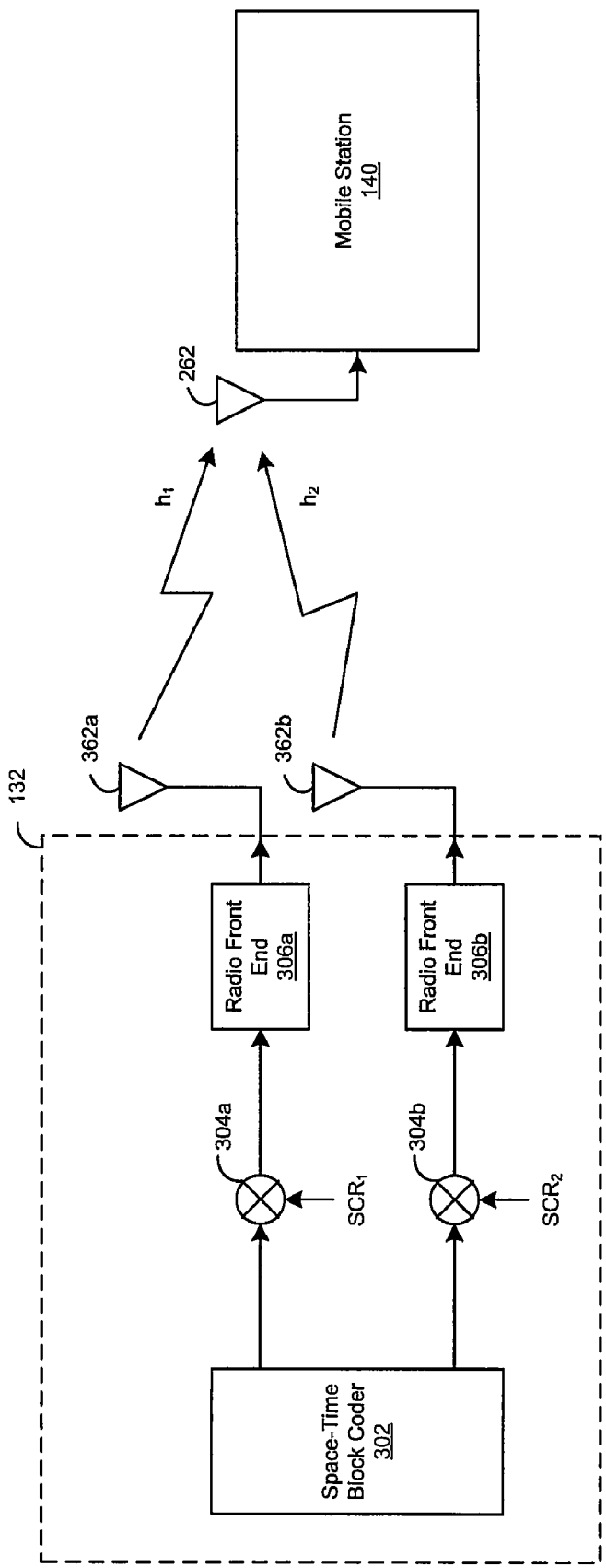
FIG. 3 is an exemplary system for space time transmit diversity, which may be utilized in connection with an embodiment of the invention.

FIG. 3 is an exemplary system for space time transmit diversity, which may be utilized in connection with an embodiment of the invention. Referring to FIG. 3, there is shown a node B element 132, a plurality of transmitting antennas 362a and 362b, a mobile station (MS) 140, and a receiving antenna 262. The node B element 132 may comprise a space-time block coder (STBC) 302, a plurality of chip generator blocks 304a and 304b, and a plurality of radio front ends 306a and 306b. The transmitting antennas 362a and 362b may be substantially similar to the antenna 262.

The STBC 302 may comprise suitable logic, circuitry, and/or code that may enable output of symbols to at least one of a plurality of space time streams at a given time instant. Each symbol may comprise constellation mapped data to be transmitted by the node B element 132. An exemplary node B element 132 may utilize a quadrature phase shift keying (QPSK) constellation for mapping at least a portion of the data to a corresponding symbol. At a current time instant, the STBC 302 may simultaneously output a value of the symbol on a first space time stream, and on a second space time stream. At a subsequent time instant, the STBC 302 may output the value of the symbol on a first space time stream, while outputting a value that is a complex conjugate of the symbol, or a negative value of the complex conjugate of the symbol, on a second space time stream.

The chip generator block 304a may comprise suitable logic, circuitry, and/or code that may enable generating a chip level output signal based on input symbols from a space time stream, and a combined scrambling and OVSF code $SCR_1$. The chip level output signal may represent a spread spectrum version of the input symbols based on a spreading factor (SF) that is determined by the chip generator function implemented in the chip generator block 304a. The chip generator block 304b may be substantially similar to the chip generator block 304a. The chip generator block 304b may utilize a combined scrambling and OVSF code $SCR_2$.

The RFE block 306a may comprise suitable logic, circuitry, and/or code that may enable generation of an RF signal from a chip level output signal. The RFE block 306a may generate the RF signal by utilizing at least one frequency carrier signal to modulate the RF chain signal. The RFE block 306a may generate an RF signal that comprises an in-phase (I) component, and/or a quadrature phase (Q) component. The modulated signal may be transmitted via the transmitting antenna 362a. The RFE block 306b may be substantially similar to the RFE block 306a.

In operation, a signal transmitted from the transmitting antenna 362a, $x_1$, may be received at the MS 140 via the receiving antenna 162. Similarly, a signal transmitted from the transmitting antenna 362b, $x_2$, may also be received at the MS 140 via the receiving antenna 262. The signal $x_1$ may be subjected to signal distortions, or fading, while being transmitted via the wireless communications medium between the transmitting antenna 362a, and the receiving antenna 262. The fading characteristic of the signal $x_1$ may be represented by the channel estimate $h_1$. Similarly, the signal $x_2$ may be subjected to fading while being transmitted via the wireless communications medium between the transmitting antenna 362b, and the receiving antenna 262. The fading characteristic of the signal $x_2$ may be represented by the channel estimate $h_2$. The composite signal, y, received at the MS 140 may comprise a signal represented as $h_1 \cdot x_1$ and a signal represented as $h_2 \cdot x_2$. The composite signal y may also comprise noise associated with the wireless communication medium.

In many wireless communication environments, portions of the total energy of the transmitted signal $x_1$ depart the transmitting antenna 362a at a plurality of angles of departure (AOD). During transmission via the wireless communications medium, the different portions of the transmitted signal $x_1$ may travel via different paths to reach the receiving antenna 262. The number of different paths, and/or the length of each path, may depend upon the number of obstacles along the path, such as buildings, that may deflect the portion of the transmitted signal. The different portions of the transmitted signal may arrive at the receiving antenna 262 at various angles of arrival (AOA). Collectively, the plurality of portions of the transmitted signal, which arrive at the receiving antenna 262, may be referred to as a multipath, and each of the portions of the transmitted signal may be referred to as an individual path signal, $x_1^j$, where j represents an index for an individual path signal in a multipath. The various individual path signals may arrive at the receiving antenna 262 at different times as received individual path signals $y^j$.

Figure 4A:
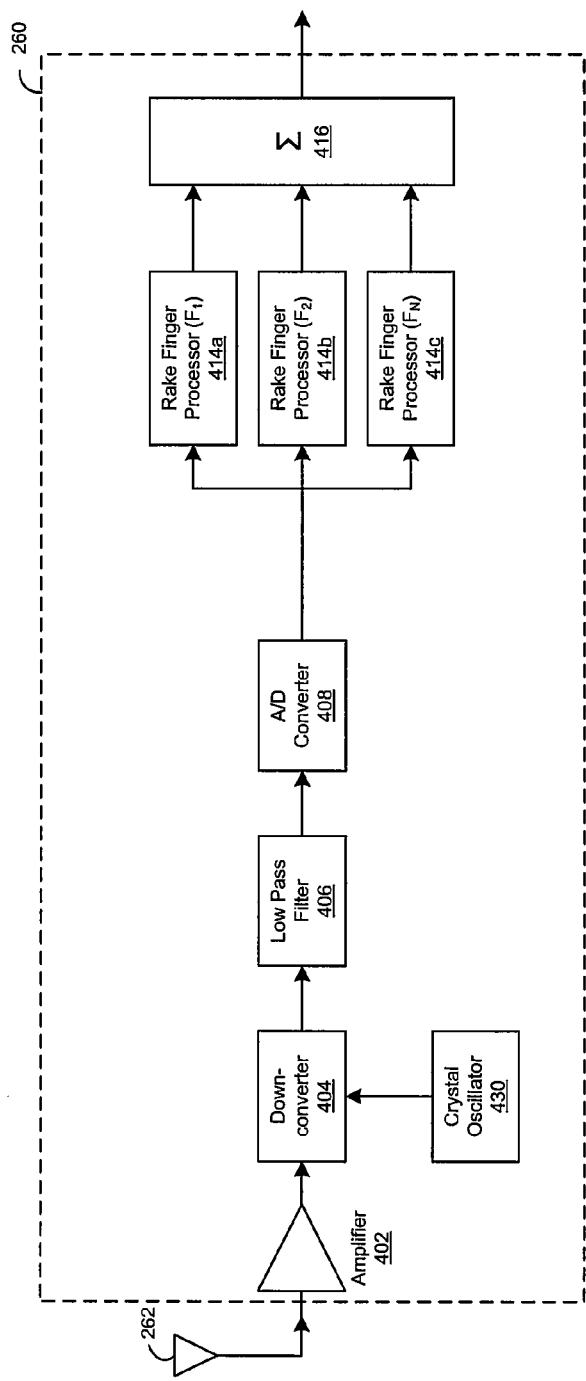
FIG. 4A is an exemplary receiver, in accordance with an embodiment of the invention.

FIG. 4A is an exemplary receiver, in accordance with an embodiment of the invention. Referring to FIG. 4A, there is shown a receiving antenna 262, and a receiver 260. The receiver 260 may comprise an amplifier 402, a down-converter 404, low pass filter (LPF) 406, an analog to digital (A/D) converter 408, a plurality of rake finger processors 414a, 414b, and 414c, a summing combiner 416, and a crystal oscillator 430.

The amplifier 402 may comprise suitable logic, circuitry, and/or code that may enable amplification of an RF signal from the receiving antenna 262. The down-converter 404 may comprise suitable logic, circuitry, and/or code that may enable demodulation of an RF signal to a baseband signal. In various embodiments of the invention, the down-converter 404 may demodulate the RF signal to an intermediate frequency (IF) signal and subsequently convert the IF signal to the baseband signal. The baseband signal may comprise an I component and/or a Q component, each of which may, in turn, comprise a plurality of symbols. The down-converter 404 may convert symbols from corresponding I and/or Q components to analog signal levels based on a QPSK constellation. Various embodiments of the invention may not be practiced with other constellation types, for example binary phase shift keying (BPSK) or 16 level quadrature amplitude modulation (16-QAM).

The LPF 406 may comprise suitable logic, circuitry, and/or code that may band limit the baseband signal from the down-converter 404 by attenuating amplitudes of frequency components in the baseband signal that are at frequencies, which are higher than the cutoff frequency associated with the LPF 406.

The A/D converter 408 may comprise suitable logic, circuitry, and/or code that may enable individual analog signal levels in a band limited baseband signal to be converted to a finite word-length value. For example, a 6-bit A/D converter may convert the analog signal to 64 levels, each level can be represented by a 6-bit integer. The A/D converter maps the analog value to the closest one of the 64 levels.

The rake finger processor 414a may comprise suitable logic, circuitry, and/or code that may enable reception, descrambling, and/or despreading of a received individual path signal $y^j$ for j=1, for example. In an exemplary embodiment of the invention, the rake finger processor 414a may despread and/or descramble the individual path signal to derive one or more data symbols.

The rake finger processor 414b may be substantially similar to the rake finger processor 414a. The rake finger processor 414b may enable reception of signals corresponding to individual path signal j=2, for example. The rake finger processor 414c may be substantially similar to the rake finger processor 414a. The rake finger processor 414c may enable reception of signals corresponding to individual path signal j=3, for example.

The summing combiner 416 may comprise suitable logic, circuitry, and/or code that may enable computing a weighted average of values generated by the plurality of rake finger processors 414a, 414b, and 414c. In an exemplary embodiment of the invention, the summing combiner 416 may enable computation of a weighted average that is based on maximal ratio combining (MRC) of the values generated by the rake finger processors. In another exemplary embodiment of the invention, the summing combiner 416 may enable computation of a weighted average that is based on equal gain combining (EGC) of the values generated by the rake finger processors.

The crystal oscillator 430 may comprise suitable logic, circuitry, and/or code that may enable generation of a down-conversion signal. The down-conversion signal may be utilized by the down-converter 404 to demodulate received signals from the amplifier 402.

In operation, the down-converter 404 may utilize a frequency, associated with the down conversion signal received from the crystal oscillator 430, to down-convert a current received signal y(t). The demodulated signal may be filtered by the LPF 406 and converted into a digital signal by the A/D converter 408. The digital signal may comprise I and Q components. A rake finger processor 414a may down-sample, descramble and despread the signal and integrate the descrambled and despread chips to derive one or more symbols. An RSCP signal and/or noise measurement may be computed for each derived symbol, for example. A processor 254 may configure the rake finger processor 414a to utilize a selected channel estimation filter bandwidth, as measured in integration length in chips and/or filter coefficients, when filtering the pilot signals. The symbols generated by each of the rake finger processors 414a, 414b, and 414c may be combined by the summing combiner 416 to derive a symbol based on a weighted sum of the symbols derived from each of the rake finger processors.

In various embodiments of the invention, each of the rake finger processors 414a, 414b, and 414c may be implemented in distinct hardware instantiations, or one or more of the rake finger processors may be implemented in a single hardware instantiation by utilizing time multiplexing for processing distinct individual path signals at distinct time instants.

Figure 4B:
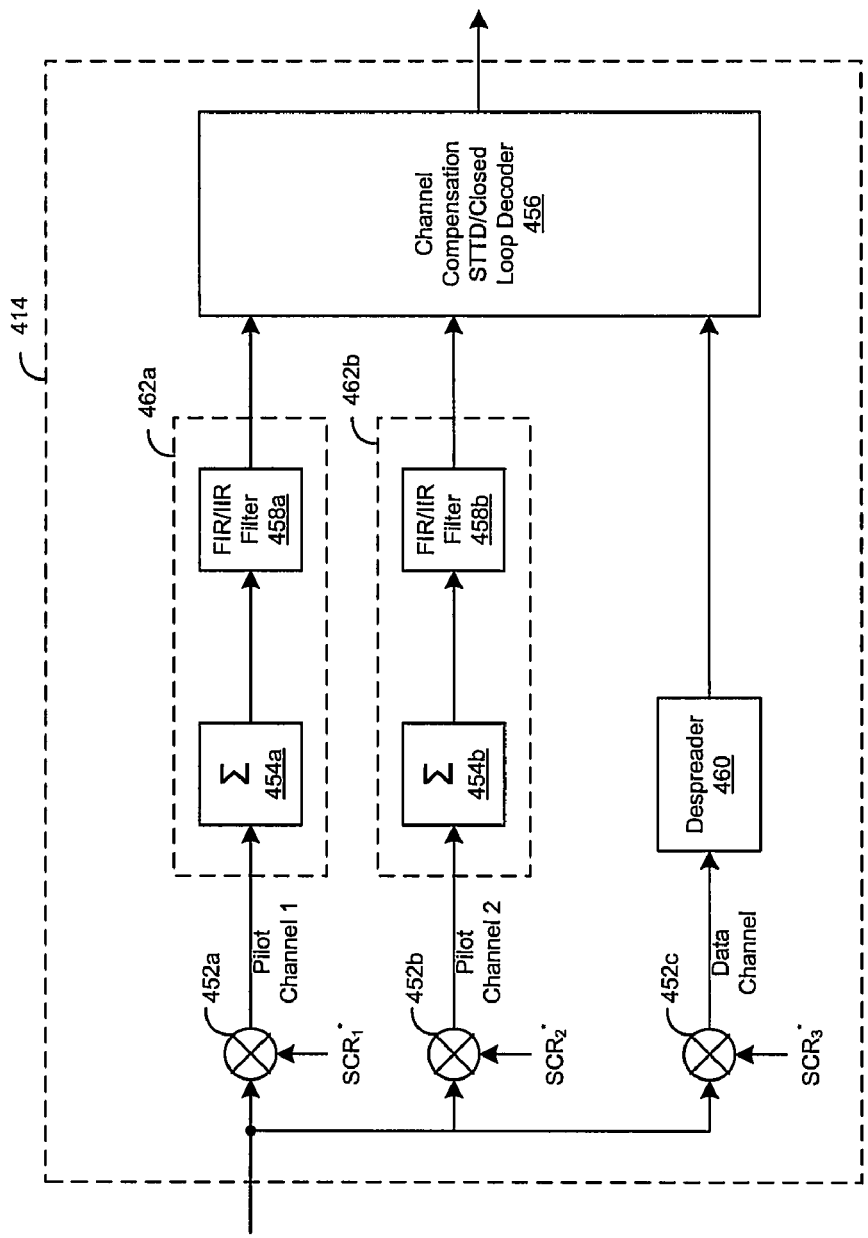
FIG. 4B is a block diagram of an exemplary rake finger processor, in accordance with an embodiment of an invention.

FIG. 4B is a block diagram of an exemplary rake finger processor, in accordance with an embodiment of an invention. Referring to FIG. 4B, there is shown a rake finger processor 414. The rake finger processor 414 may represent any of the rake finger processors 414a, 414b, and/or 414c as shown in FIG. 4A. The rake finger processor 414 may comprise a plurality of descrambler blocks 452a, 452b and 452c, a plurality of channel estimation filter blocks 462a and 462b, a despreader block 460, and a decoder block 456. The channel estimation filter block 462a may comprise an accumulator block 454a, and a finite impulse response or infinite impulse response (FIR/IIR) filter block 458a. The channel estimation filter block 462b may comprise an accumulator block 454b, and an FIR/IIR filter block 458b.

The descrambler block 452a may comprise suitable logic, circuitry, and/or code that may enable a chip level signal to be descrambled to generate a descrambled signal. The descrambler block 452a may utilize a descrambling code $SCR_1^*$ when descrambling the descrambled signal. The descrambled signal may comprise data from a first pilot channel, as indicated in FIG. 4B by the reference label, pilot channel 1. The descrambler block 452b may be substantially similar to the descrambler block 452a. The descrambler block 452b may utilize a descrambling code $SCR_2^*$ when descrambling the chip level signal. The descrambled signal may comprise data from a second pilot channel, as indicated in FIG. 4B by the reference label, pilot channel 2. The descrambler block 452c may be substantially similar to the descrambler block 452a. The descrambler block 452c may utilize a descrambling code $SCR_3^*$ when descrambling the chip level signal. The descrambled signal may comprise data from a data channel, as indicated in FIG. 4B by the reference label, data channel.

The accumulator block 454a may comprise suitable logic, circuitry, and/or code that may enable detection of energy from a descrambled signal. The accumulator block 454a may generate a data symbol level signal. For example, when the received signal is from the CPICH, the data symbol may be a pilot symbol. The energy from a plurality of chips comprising an integration length may be summed to enable computation of an RSCP signal level. The integration length may be configured based on control signals and/or data from the processor 254. The accumulator block 454b may be substantially similar to the accumulator block 454a. The despreader block 460 may be substantially similar to the accumulator block 454a.

The FIR/IIR filter block 458a may comprise suitable logic, circuitry, and/or code that may enable computation of a filtered pilot symbol based on a current received pilot symbol and one or more previously received pilot symbols. A value for the filtered pilot symbol may be computed based on a weighted sum based on the current received pilot symbol and on the one or more previously received pilot symbols. The weighting factors utilized for computing the weighted sum may be based on filter coefficients configured for the FIR/IIR filter block 458a. The filtered pilot symbols may be utilized to enable computation of CSIT, for example, channel estimates h₁ and/or h₂. The FIR/IIR filter block 458*b* may be substantially similar to the FIR/IIR filter block 458*a*.

The decoder block 456 may comprise suitable logic, circuitry, and/or code that may enable channel compensation, including space time decoding of received signals, which were transmitted utilizing STTD, and/or decoding of received signals in a closed loop system. For example, the decoder block 456 may utilize a space time coding matrix to enable reception of a signal, s₁, from the channel estimation filter block 462*a*, and a signal, s₂, from the channel estimation filter block 462*b* at a current time instant, while enabling at a succeeding time instant, reception of a signal, s₁, from the channel estimation filter block 462*a*, and a complex conjugate signal, s₂*, from the channel estimation filter block 462*b*.

Figure 5:
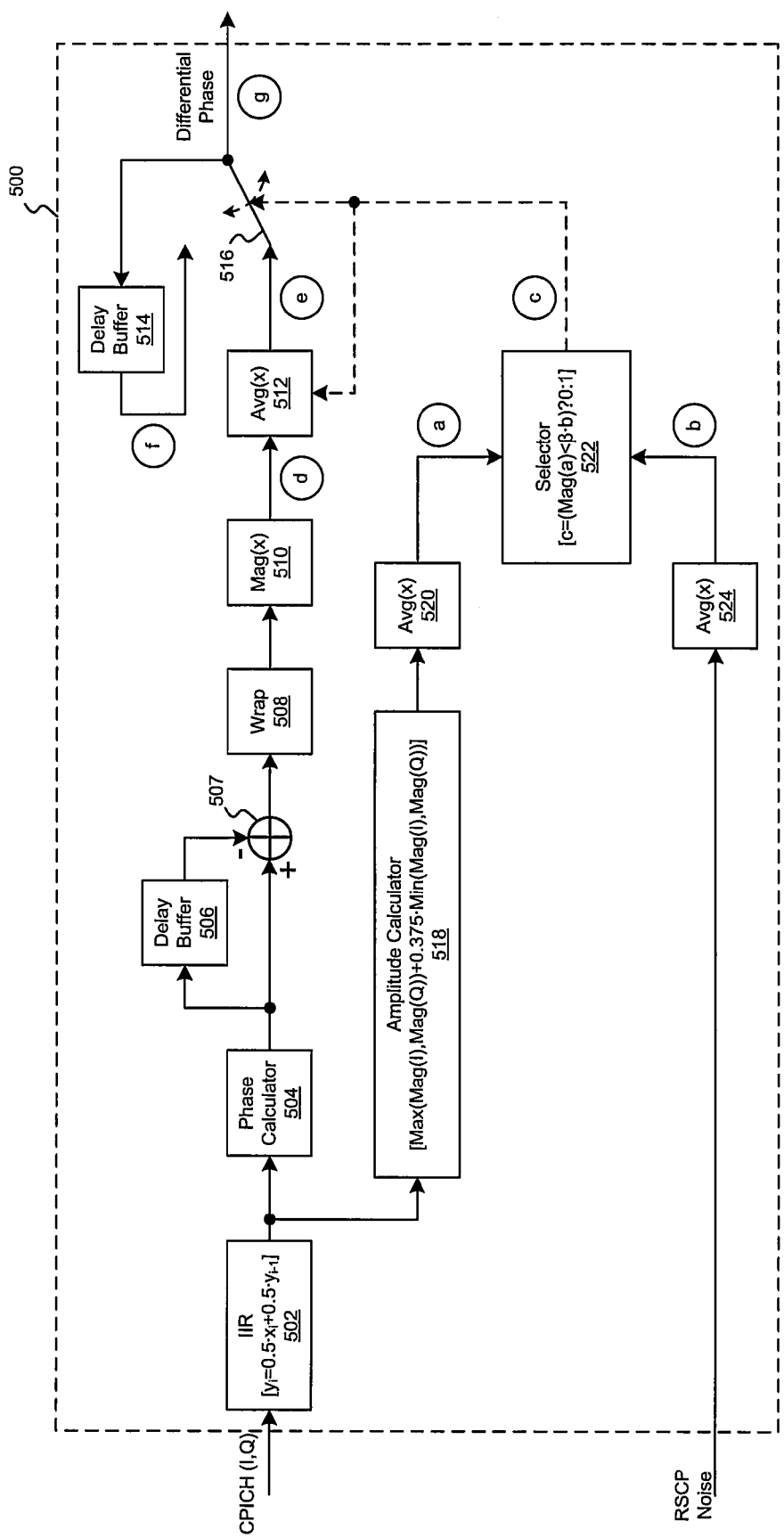
FIG. 5 is a block diagram of an exemplary differential phase estimator, in accordance with an embodiment of the invention.

FIG. 5 is a block diagram of an exemplary differential phase estimator, in accordance with an embodiment of the invention. Referring to FIG. 5, there is shown a differential phase estimator 500. The differential phase estimator 500 may comprise an infinite impulse response (IIR) filter 502, a phase calculator 504, delay buffers 506 and 514, summing block 507, a wrap block 508, a magnitude (Mag(x)) block 510, averaging (Avg(x)) blocks 512, 520 and 524, a selector switch 516, an amplitude calculator block 518, and a selector block 522.

The differential phase estimator 500 may be contained within a receiver section 260 of a mobile station (MS) 140 (FIG. 2). The differential phase estimator 500 may receive input signals from the CPICH comprising despread symbols, each of which may be represented by an I component and a Q component. Symbols, or samples, may arrive at the differential phase estimator 500 at a rate $r_{Smp}$, for example. Since CPICH symbols comprise pilot symbols of determinate value, for example for each symbol I=1 and Q=1, a determinate phase may be associated with each pilot symbol transmitted by a node B element 132, or BTS 118. The phase of the received pilot symbol may be computed at the MS 140. The differential phase estimator 500 may compute a phase difference when the phase of a current received pilot symbol is different from the phase of one or more previous received pilot symbols.

In an exemplary embodiment of the invention, the phase difference may be computed based on the phase of a current pilot symbol received at a time instant t, Sym(t), and the phase of a pilot symbol received 2 sample periods previous to the current time instant t, Sym(t−2·$\delta_{Smp}$). In other exemplary embodiments of the invention a phase difference may be computed based on the phase of the current pilot symbol and a pilot symbol received n sample periods previously, Sym(t−n·$\delta_{Smp}$), where n is a number, the value of which may be determined by code executed by the processor 254, for example.

In various embodiments of the invention, a phase difference may be computed that may be a weighted sum based on the phase of the current pilot symbol, and of a plurality of selected previous pilot symbols. Individual weighting scale factors utilized in computing the weighted sum may be greater than 0 or less than 0. In various other embodiments of the invention, a phase difference may be computed for a given pilot symbol that is a weighted sum based on the phase of the given pilot symbol, one or more selected previous pilot symbols, and one or more selected subsequent pilot symbols.

The magnitudes, or absolute values, of phase differences computed across a range of time instants may be averaged. Based on the average, a differential phase value may be computed. The differential phase value may be communicated to the processor 254. The processor 254 may communicate the differential phase value to the transmitter 258, which may then enable the differential phase value to be communicated to the node B element 132 via an uplink channel. The processor 254 may subsequently modify the channel estimation filter bandwidth by changing the integration length or the filter coefficients. The node B element 132 may subsequently decide to change an operating mode in the MS 140 from open loop transmit diversity to closed loop transmit diversity (or vice versa), in response to the reported differential phase value. In an exemplary embodiment of the invention, an integration length of 1,024 chips may be selected when the differential phase value indicates that the downlink channel is a slow fading channel, while an integration length of 512 chips may be selected for a fast fading channel. If the differential phase value indicates that the channel is not too slow, an open loop transmit diversity operating mode may be selected by the node B element 132.

The differential phase estimator 500 may also receive a current RSCP noise level input. The differential phase estimator 500 may utilize current RSCP noise level input information to determine whether a current averaged differential phase at the output of the AVG(x) block 512 is to be reported to the processor 254. This operation may comprise computing an average magnitude for the current finger and comparing the computed average magnitude to a value based on the current RSCP noise level input. In one regard, the operation may be comparable to a threshold operation in which the current finger averaged magnitude may be compared to a threshold level to determine if the current symbol magnitude is sufficient for reporting the differential phase value. In an exemplary embodiment of the invention, the current symbol magnitude may be compared to a threshold level that may range in value from 0 to 8 times the current RSCP noise level input value.

In a compressed mode of operation, the differential phase estimator 500 may not receive CPICH input signals during arbitrary time intervals. In this case, a current computed average of previous computed phase difference magnitudes may be maintained for up to n sample intervals after the differential phase estimator 500 resumes reception of CPICH input signals, where n represents the maximum number of sample intervals between receipt of the current pilot symbol, and receipt of any previous pilot symbol.

In the case where the differential phase estimator 500 supports STTD, phase differences may be computed for CPICH symbols generated by each channel estimation filter block, 462*a* and 462*b*, within each rake finger processor 414. The computed differential phase value may comprise an average value based on the differential phase value computed based on the pilot symbol generated by the channel estimation filter block 462*a*, and the differential phase value computed based on the pilot symbol generated by the channel estimation filter block 462*b*.

The IIR filter 502 may comprise suitable logic, circuitry, and/or code that may enable filtering of noise components from a received CPICH signal. The IIR filter 502 may implement a low pass filtering function that attenuates noise components at frequencies higher than the cutoff frequency of the low pass filter. Various embodiments of the invention may also utilize other types of filters, for example finite impulse response (FIR) filters, which enable filtering of noise components from a received CPICH signal. In an exemplary embodiment of the invention, the IIR filter 502 may generate a current filtered output, $y_i$, based on a current input $x_i$, as shown in the following equation:

$$y_i = 0.5 \cdot x_i + 0.5 \cdot y_{i-1} \qquad [1]$$

where $y_{i-1}$ may represent a preceding filtered output value. The current input, current filtered output, and preceding filtered output may each comprise corresponding I and Q component values.

The phase calculator 504 may comprise suitable logic, circuitry, and/or code that may enable calculation of a phase value for a current input. The current input may comprise I and Q components. The output from the phase calculator 504 may be a computed phase value. In an exemplary embodiment of the invention, the computed phase value may comprise a range of values from greater than or equal to $-\pi$ to less than or equal to $\pi$.

The delay buffer 506 may comprise suitable logic, circuitry, and/or code that may enable buffering, or storage, of one or more input samples. The delay buffer may delay output of the input value by a time duration of $n \cdot \delta_{Smp}$, where n may represent the number of input samples that may be simultaneously stored within the delay buffer 506, and $\delta_{Smp}$ may represent the time interval between successive samples. In an exemplary embodiment of the invention, n=2, and each input sample may comprise a computed phase value.

The summing block 507 may comprise suitable logic, circuitry, and/or code that may enable computation of a summation value based on a plurality of inputs. In an exemplary embodiment of the invention, the summing block 507 receives 2 inputs, comprising a first input, $x_1$, and a second input, $x_2$, wherein the value for the input $x_2$ may be negated. The inputs $x_1$ and $x_2$ may each comprise a computed phase value, and the output may comprise a computed phase difference value. Thus, the summing block 507 may generate an output, y, as shown in the following equation:

$$y = x_1 - x_2 \qquad [2]$$

The wrap block 508 may comprise suitable logic, circuitry, and/or code that may enable generation of an output value that is a modulus of an input value based on specified base value. In an exemplary embodiment of the invention, the wrap block 508 may receive an input value, and generate an output value that comprises a range of values from greater than or equal to $-\pi$ to less than or equal to $\pi$. The input value may be a computed phase difference value. In this regard, the wrap block may generate an output value, y, that is a modulus of the input value, x, for a base value of $\pi$, which may be represented as shown in the following equation:

$$y = \mathrm{Mod}_\pi(x) \qquad [3]$$

The Mag(x) block 510 may comprise suitable logic, circuitry, and/or code that may enable generation of an output value based on a computed magnitude of an input value. In an exemplary embodiment of the invention, for scalar values of the input value x, an output value may be computed as shown in the following equation:

$$y = |x| \qquad [4]$$

wherein the input value, x, may be a computed phase difference value converted to a modulus $\pi$ value.

The Avg(x) block 512 may comprise suitable logic, circuitry, and/or code that may enable generation of an output value based on a computed weighted sum of a sequence of input values. In an exemplary embodiment of the invention, a current output value $y_i$, may be generated based on a computed weighted sum of a current input value, $x_i$, and of n previous input values $x_{i-1}, x_{i-2}, \ldots, x_{i-n}$, as shown in the following equation:

$$y_i = \sum_{k=0}^{n} a_k \cdot x_{i-k} \qquad [5]$$

wherein each value $x_{i-k}$ may be an absolute value of a modulus $\pi$ converted computed phase difference value, and each value $$a_k = \frac{1}{n+1}.$$

In other embodiments of the invention, each value $a_k$ may be selected individually.

The delay buffer 514 may be substantially similar to the delay buffer 506. In an exemplary embodiment of the invention, n=1, and each input sample may comprise a computed current differential phase value.

The amplitude calculator 518 may comprise suitable logic, circuitry, and/or code that may enable computation of an output value that is a computed amplitude value for an input value comprising I and Q component values, wherein the I and Q components are represented as scalar values. The computed output value may comprise an RSCP signal level value. In an exemplary embodiment of the invention, the input value, x, may comprise a filtered signal based on a current received CPICH signal. The output value, y, may be computed as shown in the following equation:

$$y = \mathrm{Max}(|x_I|, |x_Q|) + 0.375 \cdot \mathrm{Min}(|x_I|, |x_Q|) \qquad [6]$$

where $x_I$ and $x_Q$ represent the I and Q components of x respectively, the expression Max(a,b) evaluates to the larger of the values a and b, and the expression Min(a,b) evaluates to the smaller of the values a and b.

The Avg(x) block 520 may be substantially similar to the Avg(x) block 512. In an exemplary embodiment of the invention, each input sample may comprise a computed amplitude value.

The Avg(x) block 524 may be substantially similar to the Avg(x) block 512. In an exemplary embodiment of the invention, each input sample may comprise an RSCP noise level value.

The selector block 522 may comprise suitable logic, circuitry, and/or code that may enable generation of an output value based on a plurality of input values. In an exemplary embodiment of the invention, the selector block 522 receives two input values, $x_1$ and $x_2$. The input $x_1$ may be identified in FIG. 5 by the reference label a. The input $x_2$ may be identified in FIG. 5 by the reference label b. The input $x_1$ may comprise a computed averaged magnitude value, the input $x_2$ may comprise a computed averaged RSCP noise level value, and the output y may comprise a selector output signal. For scalar values of inputs $x_1$ and $x_2$, the output value, y, may be computed shown in the following pseudo-code segment:

$$\text{If } (|x_1| < \beta \cdot |x_2|) \qquad [7]$$
$$y = 0$$
$$\text{Else}$$
$$y = 1$$

where the variable $\beta$ represents a weighting scale factor that comprises an exemplary range of values $0 \leq \beta \leq 8$.

The selector switch 516 may comprise suitable logic, circuitry, and/or code that may enable one of a plurality of inputs to be coupled to an output based on the value of a selector input signal. In an exemplary embodiment of the invention the selector switch 516 receives inputs $x_1$ and $x_2$, and a selector input c. The output, y, may comprise a current differential phase value. The input $x_1$ may comprise a computed weighted sum of absolute values of modulus π converted phase difference values. The input $x_2$ may comprise a preceding differential phase value. The input $x_1$ may be coupled to the output y when c=1. The input $x_2$ may be coupled to the output y when c=0.

In operation for an exemplary embodiment of the invention, a CPICH signal, comprising I and Q components at a current time instant t, CPICH(I,Q,t). The CPICH(I,Q,t) signal may comprise a current pilot symbol, PS(I,Q,t). The CPICH (I,Q,t) signal may be filtered by the IIR block 502 as set forth in equation [1]. The phase calculator 504 may compute a current phase value, $\phi(t)$, based on the I and Q component values in the current pilot symbol PS(I,Q,t). The summing block 507 may compute a current phase difference value, $\Delta\phi(t)$, based on the current phase value $\phi(t)$ and a previous phase value computed 2 sample intervals earlier, $\phi(t-2\cdot\delta_{Smp})$, as set forth in equation [2]. The wrap block 508 may compute a modulus value, $\text{Mod}_\pi(\Delta\phi(t))$, such that:

$$-\pi \leq \text{Mod}_\pi(\Delta\phi(t)) \leq \pi \quad [8]$$

The Mag(x) block 510 may compute an absolute value such that:

$$0 \leq |\text{Mod}_\pi(\Delta\phi(t))| \leq \pi \quad [9]$$

The output from the Mag(x) block 510 is indicated in FIG. 5 by the reference label d.

The amplitude calculator block 518 may compute a current magnitude value, A(t), for the current pilot symbol PS(I,Q,t) as set forth in equation [6]. The Avg(x) block 520 may compute an average value, $A_{Avg}(t)$, for a plurality of current and preceding computed magnitude values as set forth in equation [5]. The output from the Avg(x) block 520 is indicated in FIG. 5 by the reference label a.

The Avg(x) block 524 may receive a current RSCP noise level value RSCP(t), and compute a current average value, $\text{RSCP}_{Avg}(t)$, for a plurality of current and preceding RSCP noise level values as set forth in equation [5]. The output from the Avg(x) block 524 is indicated in FIG. 5 by the reference label b.

The selector block 522 may compare input values associated with reference labels a and b and compute a selector output signal, indicated in FIG. 5 by the reference label c, as set forth in the pseudo-code segment [7]. The selector block 522 may set the selector output signal to a value 0 when the average magnitude value computed based on a plurality of received CPICH pilot signals may be less than the weighted value of the average value computed based on a plurality of received RSCP noise levels. The weighting scale factor utilized in connection with the RSCP noise level average value, β, may be selected from a range of values $0 \leq \beta \leq 8$.

When the average magnitude value, a, is less than a threshold level, β·b, the signal c may be communicated to instruct the Avg(x) block 512 to not utilize the current value, d (from the Mag(x) block 510), when computing an average value, which is indicated in FIG. 5 by the reference label e. In addition, the signal c may be communicated to instruct the selector switch 516 to couple the output from the delay block 514, which is indicated in FIG. 5 by the reference label f, to the differential phase output, which is indicated in FIG. 5 by the reference label g. Thus, the current differential phase output value, θ(t), may be set equal to the value of a previous differential phase output value.

The selector block 522 may set the selector output signal to a value 1 when the average magnitude value computed based on a plurality of received CPICH pilot signals is not less than the weighted value of the average value computed based on a plurality of received RSCP noise levels.

When the average magnitude value, a, is not less than the threshold level, β·b, the signal c may be communicated to instruct the Avg(x) block 512 to utilize the current value, d, when computing an average value, as indicated by the reference label e. In addition, the signal c may be communicated to instruct the selector switch 516 to couple the output from the Avg(x) block 512, as indicated by the reference label e, to the differential phase output, as indicated by the reference label g. Thus, the current differential phase output value, θ(t), may be set equal to the value as indicated by the reference label e.

Figure 6:
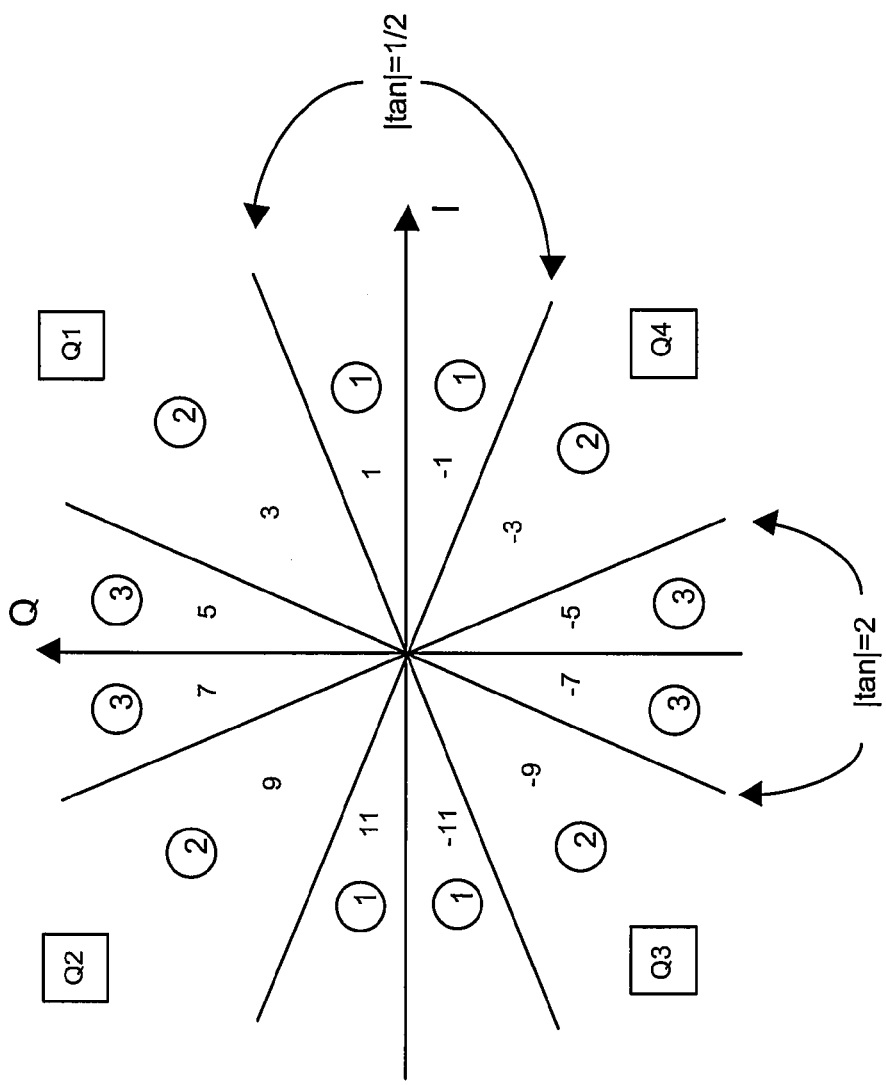
FIG. 6 is diagram illustrating exemplary phase calculation, in accordance with an embodiment of the invention.

FIG. 6 is diagram illustrating exemplary phase calculation, in accordance with an embodiment of the invention. FIG. 6 is a phase calculation diagram that details the method for calculating phase values, $\phi(t)$, in the phase calculator block 504. The following discussion refers to FIG. 6. After receiving the current pilot symbol PS(I,Q,t), the sign for the I component Sign(I), and sign for the Q component Sign(Q) may be determined, where the expression Sign(x) is positive (+1) for values $x \geq 0$, and negative (−1) for values x<0.

Based on the signs for the I and Q components, a quadrant in the phase calculation diagram may be selected from the plurality of quadrants indicated by reference labels Q1, Q2, Q3, and Q4. For Sign(I): +1, and Sign(Q): +1, the quadrant Q1 may be selected. For Sign(I): −1, and Sign(Q): +1, the quadrant Q2 may be selected. For Sign(I): −1, and Sign(Q): −1, the quadrant Q3 may be selected. For Sign(I): +1, and Sign(Q): −1, the quadrant Q4 may be selected.

Next, a ratio of I the Q components, Q/I, may be computed. The current phase angle value for the current pilot symbol PS(I,Q,t) may be computed as set forth in the following equation:

$$\varphi(t) = \tan^{-1}\left(\left|\frac{Q}{I}\right|\right) \quad [10]$$

where the phase angle may be measured in radians.

The computed phase angle value as set forth in equation [10] may be utilized to select a sector within the selected quadrant. A sector within the selected quadrant is selected from the plurality of sectors indicated in each quadrant by the reference labels 1, 2, and 3. For values $$0 \leq \left|\frac{Q}{I}\right| \leq \frac{1}{2}, \text{ or } 0 \leq \varphi(t) \leq \tan^{-1}\left(\frac{1}{2}\right),$$

sector 1 may be selected within the selected quadrant. For values $$2 \leq \left|\frac{Q}{I}\right|, \text{ or } \tan^{-1}(2) \leq \varphi(t),$$

sector 3 may be selected within the selected quadrant. For values $$\frac{1}{2} < \left|\frac{Q}{I}\right| < 2, \text{ or } \tan^{-1}\left(\frac{1}{2}\right) < \varphi(t) < \tan^{-1}(2),$$

sector 2 may be selected within the selected quadrant.

Having determined the quadrant and the sector within the quadrant, the phase angle may be computed as set forth in the following pseudo-code segment:

If quadrant = Q1  [11]

If sector = 1

$$\varphi(t) = \frac{1}{12} \cdot \pi$$

If sector = 2

$$\varphi(t) = \frac{3}{12} \cdot \pi$$

If sector = 3

$$\varphi(t) = \frac{5}{12} \cdot \pi$$

If quadrant = Q2

If sector = 1

$$\varphi(t) = \frac{11}{12} \cdot \pi$$

If sector = 2

$$\varphi(t) = \frac{9}{12} \cdot \pi$$

If sector = 3

$$\varphi(t) = \frac{7}{12} \cdot \pi$$

If quadrant = Q3

If sector = 1

$$\varphi(t) = -\frac{11}{12} \cdot \pi$$

If sector = 2

$$\varphi(t) = -\frac{9}{12} \cdot \pi$$

If sector = 3

$$\varphi(t) = -\frac{7}{12} \cdot \pi$$

If quadrant = Q4

If sector = 1

$$\varphi(t) = -\frac{1}{12} \cdot \pi$$

If sector = 2

$$\varphi(t) = -\frac{3}{12} \cdot \pi$$

If sector = 3

$$\varphi(t) = -\frac{5}{12} \cdot \pi$$

Figure 7:
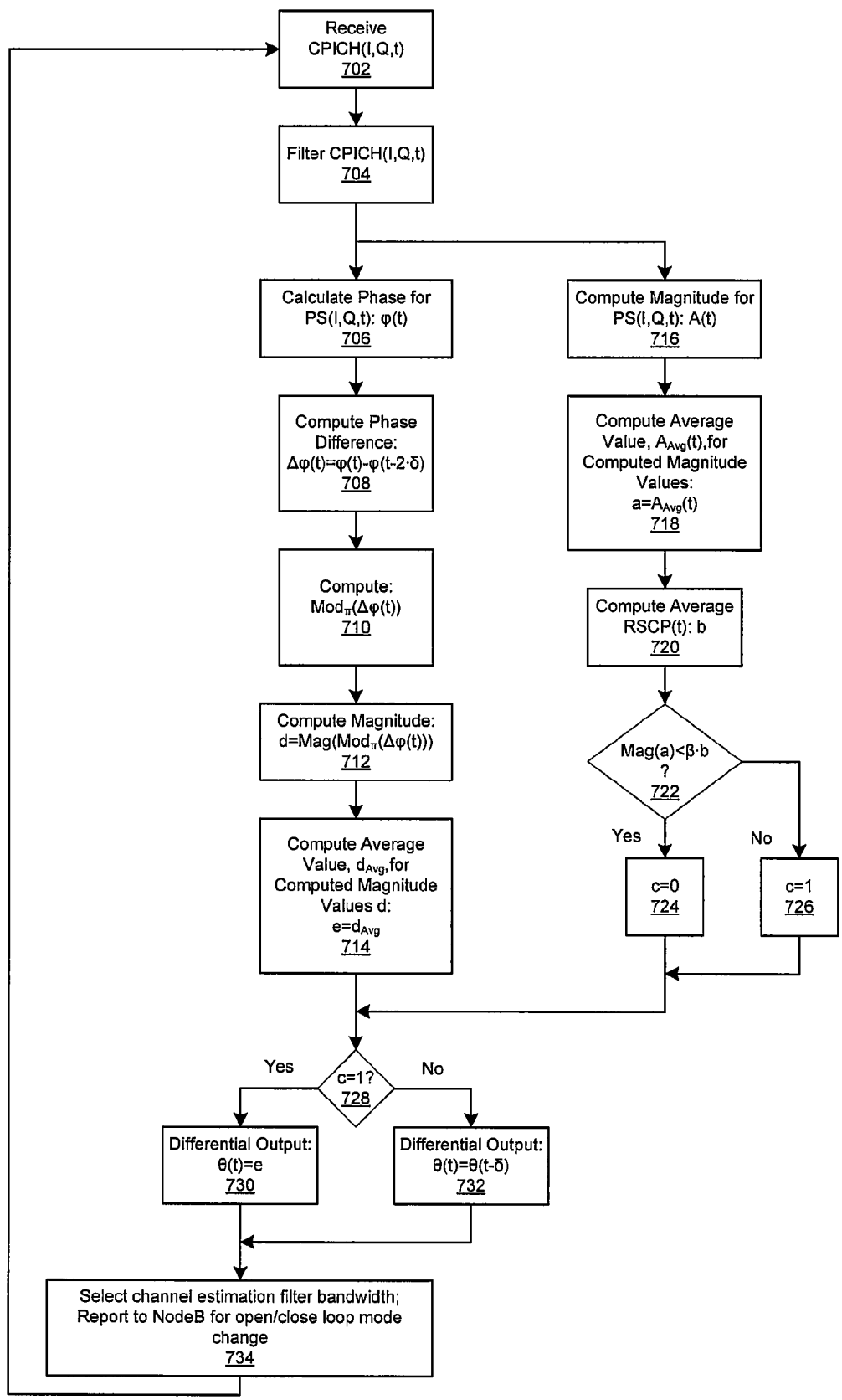
FIG. 7 is a flowchart illustrating exemplary steps for signal phase variation detection in a communication system, in accordance with an embodiment of the invention.

FIG. 7 is a flowchart illustrating exemplary steps for signal phase variation detection in a communication system, in accordance with an embodiment of the invention. The flowchart illustrated in FIG. 7, substantially follows the in operation description for FIG. 5. Referring to FIG. 7, in step 702, a CPICH(I,Q,t) signal may be received. In step 704, the CPICH (I,Q,t) signal may be filtered. The steps 706 through 714 may be performed in parallel with the steps 716 through 726.

In step 706, the phase value φ(t) may be calculated for the pilot symbol PS(I,Q,t), in step 708, a phase difference may be computed. In step 710, a modulus converted phase difference value may be calculated. In step 712, a magnitude of the modulus converted phase difference value may be calculated. The calculated value may be identified in FIG. 5 as reference label d. In step 714, an average value for d may be computed. The computed value may be identified in FIG. 5 as reference label e.

In step 716, a magnitude, A(t), for PS(I,Q,t) may be computed. In step 718, an average value for A(t) may be computed. The computed value may be identified in FIG. 5 as reference label a. In step 720, an average RSCP noise level value may be computed. The computed value may be identified in FIG. 5 as reference label b. Step 722 may determine whether the magnitude of a is greater than the weighted value for the value b. If the value Mag(a) is greater than the value β·b, then in step 724, the value associated with the reference label c=0. If Mag(a) is not greater than the value β·b, then in step 726, c=1.

Step 728 may determine whether the value c=1. If c=1, then in step 730, the current differential output value may be equal to the current value associated with the reference label e. The current differential output value may be identified in FIG. 5 as reference label g. If c=0, then in step 732, the current output differential output value may be equal to the current value associated with the preceding differential output value. The preceding differential output value may be identified in FIG. 5 as reference label f.

In step 734, the processor 254 may select the channel estimation filter bandwidth by selecting a coherent integration length and/or filter coefficients. In various embodiments of the invention, the selections in step 734 may occur after the processor 254 in a MS 140 communicates one or more differential output values to a node B element 132, and the node B element 132 can change transmit diversity mode subsequently and inform MS 140 the change. Step 702 may follow step 734.

Figure 8:
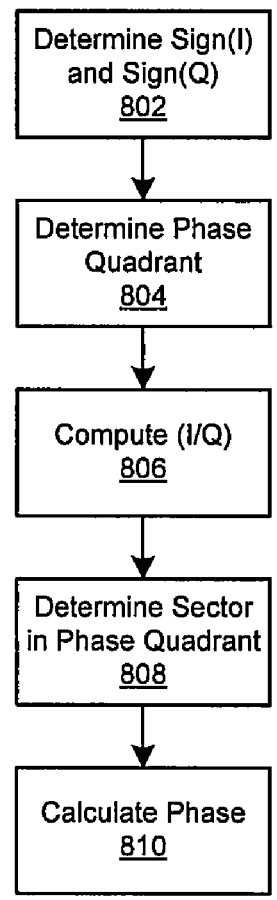
FIG. 8 is a flowchart illustrating exemplary steps for phase value calculation, in accordance with an embodiment of the invention.

FIG. 8 is a flowchart illustrating exemplary steps for phase value calculation, in accordance with an embodiment of the invention. The flowchart illustrated in FIG. 8, substantially follows the description for FIG. 6. Referring to FIG. 8, in step 802, values for Sign(I) and Sign(Q) may be determined. In step 804, a phase quadrant may be determined. In step 806, a value for the absolute value ratio |Q/I| may be determined. In step 808, a sector within the selected quadrant may be determined. In step 810, a phase value may be calculated after determining the selected quadrant, and selected sector.

Aspects of a method and system for signal phase variation detection in communication systems may comprise a differential phase estimator 500 that may enable computation of at least one phase difference value between at least one current received symbol and a corresponding at least one previous received symbol. The weighted sum may be computed from a plurality of the absolute values of computed phase difference values. A message may be transmitted by a transmitter 258 that comprises one or more differential phase values, and/or information that is derived from this differential phases. The differential phase values may be computed based on one or more computed weighted sums, and/or one or more previous differential phase values. A processor 254 may enable configuration of an operating mode in the MS 140 based on instructions from the node B element 132. The operating mode may enable an MS 140 to operate in open loop transmit diversity mode, or in closed loop transmit diversity mode. The operating mode may include configuring a selected channel estimation filter bandwidth in the form of an integration length or filter coefficients that may be utilized for receiving signals at the MS 140.

The processor 254 may enable selection of a number of chips for at least one despreading code based on the selected integration length. One or more subsequent received symbols may be generated as a result of despreading a subsequent received chip level signal by utilizing the despreading code.

The current received symbol and the corresponding previous received symbols may be pilot symbols. The current received symbol may be received at the MS 140 a selected number of received symbols following the corresponding previous received symbol. In an exemplary embodiment of the invention, the current received symbol may be received 2 symbols before the corresponding previous received symbol. The computed phase different value may be converted into a corresponding value that is greater than a specified minimum value, and less than or equal to a specified maximum value. In an exemplary embodiment of the invention, the specified minimum value is $-\pi$, and the specified maximum value is $\pi$. The computed weighted sum may be a computed average of the plurality of absolute values of computed phase difference values.

An amplitude calculator 518 may enable computation of an amplitude value for a current received symbol. An Avg(x) block 520 may enable computation of an average value for the computed amplitude value for the current received symbol and at least one computed amplitude value for a previous received symbol. A selector 522 may enable selection of the computed weighted sum, or previous differential phase value based on a comparison of the computed average value from the Avg(x) block 520, and a computed average value of a plurality of received signal code power signal level values.

Another aspect of the system may enable a differential phase estimator 500 at a mobile station (MS) 140 to compute at least one phase difference value between at least one current received symbol and a corresponding at least one previous received symbol. The weighted sum may be computed from a plurality of the absolute values of computed phase difference values. At least one differential phase value may be computed at the MS 140 based on one or more computed weighted sums, and/or one or more previous differential phase values. The computed at least one differential phase value may be communicated to a node B element 132 by a transmitter 258. Upon receiving, from the node B element 132, data responsive to the communicated at least one differential phase value, a processor 254 may enable configuration of an operating mode in the MS 140 based on the data received from the node B element 132.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for receiving signals in a wireless communication system, the method comprising:

computing at a first wireless device, at least one phase difference value between at least one current received symbol and a corresponding at least one previous received symbol;

computing at said first wireless device, at least one weighted sum of a plurality of absolute values of said computed at least one phase difference value;

computing at said first wireless device, at least one differential phase value based on at least one or both of: said computed at least one weighted sum and a previous said at least one differential phase value, wherein said computed at least one differential phase value is communicated to a second wireless device; and upon receiving from said second wireless device, data responsive to said at least one differential phase value communicated to said second wireless device, configuring an operating mode of said first wireless device based on said data received from said second wireless device.

2. The method according to claim 1, wherein said operating mode is at least one of: open loop transmit diversity, closed loop transmit diversity, and a selected channel estimation filter bandwidth.

3. The method according to claim 2, comprising at least one or both of: selecting a number of chips for at least one despreading code based on said selected integration length, and configuring one or more filter coefficients.

4. The method according to claim 3, comprising generating at least one subsequent received symbol as a result of despreading a subsequent received chip level signal by utilizing said despreading code.

5. The method according to claim 1, wherein said at least one current received symbol and said corresponding at least one previous received symbol is a pilot symbol.

6. The method according to claim 1, wherein said at least one current received symbol is received a selected number of received symbols following said corresponding at least one previous received symbol.

7. The method according to claim 1, wherein said at least one computed phase difference value is converted to a corresponding value that is greater than or equal to a specified minimum value, and is less than or equal to a specified maximum value.

8. The method according to claim 1, wherein each of said at least one computed weighted sum is a computed average of said plurality of absolute values of said computed at least one phase difference value.

9. The method according to claim 1, comprising computing an amplitude value for said at least one current received symbol.

10. The method according to claim 9, comprising computing an average value comprising said computed amplitude value for said at least one current received symbol and at least one computed amplitude value for said at least one previous received symbol.

11. The method according to claim 10, comprising selecting said computed at least one weighted sum, or said previous said at least one differential phase value, based on a comparison of said computed average value and a computed average value of a plurality of received signal code power signal level values.

12. A system for receiving signals in a wireless communication system, the system comprising:
- at least one circuit that is operable to compute, at a first wireless device, at least one phase difference value between at least one current received symbol and a corresponding at least one previous received symbol;
- said at least one circuit is operable to compute, at said first wireless device, at least one weighted sum of a plurality of absolute values of said computed at least one phase difference value;
- said at least one circuit is operable to compute, at said first wireless device, at least one differential phase value based on at least one or both of: said computed at least one weighted sum and a previous said at least one differential phase value, wherein said computed at least one differential phase value is communicated to a second wireless device; and
- said at least one circuit is operable, upon receiving from said second wireless device data responsive to said at least one differential phase value communicated to said second wireless device, to configure an operating mode of said first wireless device based on said data received from said second wireless device.

13. The system according to claim 12, wherein said operating mode is at least one of: open loop transmit diversity, closed loop transmit diversity, and a selected channel estimation filter bandwidth.

14. The system according to claim 13, wherein said at least one circuit is operable to perform one or both of selection of a number of chips for at least one despreading code based on said selected integration length, and configuration of one or more filter coefficients.

15. The system according to claim 14, wherein said at least one circuit is operable to generate at least one subsequent received symbol as a result of despreading a subsequent received chip level signal by utilizing said despreading code.

16. The system according to claim 12, wherein said at least one current received symbol and said corresponding at least one previous received symbol is a pilot symbol.

17. The system according to claim 12, wherein said at least one current received symbol is received a selected number of received symbols following said corresponding at least one previous received symbol.

18. The system according to claim 12, wherein said at least one computed phase difference value is converted to a corresponding value that is greater than or equal to a specified minimum value, and is less than or equal to a specified maximum value.

19. The system according to claim 12, wherein each of said at least one computed weighted sum is a computed average of said plurality of absolute values of said computed at least one phase difference value.

20. The system according to claim 12, wherein said at least one circuit is operable to compute an amplitude value for said at least one current received symbol.

21. The system according to claim 20, wherein said at least one circuit is operable to compute an average value comprising said computed amplitude value for said at least one current received symbol and at least one computed amplitude value for said at least one previous received symbol.

22. The system according to claim 21, wherein said at least one circuit is operable to select said computed at least one weighted sum, or said previous said at least one differential phase value, based on a comparison of said computed average value and a computed average value of a plurality of received signal code power signal level values.

* * * * *